US012559333B2

(12) United States Patent
Bueno Espinal et al.

(10) Patent No.: US 12,559,333 B2
(45) Date of Patent: Feb. 24, 2026

(54) VACUUM CONVEYOR SYSTEM FOR INKJET PRINTING WITH ADJUSTMENT TO THE COVERED AREA

(71) Applicant: Electronics for Imaging, Inc., Londonderry, NH (US)

(72) Inventors: Eduardo Bueno Espinal, Almazora (ES); Juan Escudero Gonzalez, Almazora (ES)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

(21) Appl. No.: 18/761,938

(22) Filed: Jul. 2, 2024

(65) Prior Publication Data

US 2024/0351812 A1 Oct. 24, 2024

Related U.S. Application Data

(63) Continuation of application No. 17/523,723, filed on Nov. 10, 2021, now Pat. No. 12,049,378.

(51) Int. Cl.
*B65H 5/22* (2006.01)
*B41J 11/00* (2006.01)

(52) U.S. Cl.
CPC ............ *B65H 5/224* (2013.01); *B41J 11/007* (2013.01); *B41J 11/0085* (2013.01); *B65H 2406/322* (2013.01)

(58) Field of Classification Search
CPC ...... B65H 2406/3221; B65H 2406/322; B65H 2406/3622
See application file for complete search history.

(56) References Cited

U.S. PATENT DOCUMENTS

| | | | |
|---|---|---|---|
| 6,270,074 B1 | 8/2001 | Rasmussen et al. |
| 6,571,702 B2 | 6/2003 | Wotton et al. |
| 6,672,720 B2 | 1/2004 | Smith |
| 6,927,841 B2 | 8/2005 | Hinojosa et al. |
| 9,815,303 B1 | 11/2017 | Herrmann et al. |

(Continued)

FOREIGN PATENT DOCUMENTS

| | | |
|---|---|---|
| DE | 102017218930 A1 | 5/2018 |
| EP | 3118008 A1 | 1/2017 |
| ES | 2310490 B1 | 11/2009 |

*Primary Examiner* — Howard J Sanders
(74) *Attorney, Agent, or Firm* — PERKINS COIE LLP

(57) ABSTRACT

Apparatus, methods, and systems for a vacuum conveyor for inkjet printing with adjustment to the covered area are disclosed. In some embodiments, a controller of a vacuum conveyor expands first one or more actuators of multiple first actuators of a substrate transportation system to decrease a suction width of an area of suction provided by the vacuum conveyor in accordance with a substrate width of a substrate being inkjet printed using the vacuum conveyor. A second one or more actuators of the multiple first actuators being retracted. The controller retracts multiple second actuators of the vacuum conveyor to increase the suction length of the area of suction while the substrate transportation system moves the substrate along the vacuum conveyor for inkjet printing of the substrate. The controller expands the retracted actuators of the multiple first actuators to increase the suction length as the substrates exit the vacuum conveyor.

19 Claims, 10 Drawing Sheets

(56) References Cited

U.S. PATENT DOCUMENTS

| | | | | |
|---|---|---|---|---|
| 2002/0067403 | A1 | 6/2002 | Smith | |
| 2002/0110400 | A1 | 8/2002 | Beehler et al. | |
| 2005/0156376 | A1 | 7/2005 | Kondratuk et al. | |
| 2006/0043666 | A1 | 3/2006 | Piccinino | |
| 2010/0213666 | A1* | 8/2010 | Harney .............. | H04N 1/00705 271/276 |
| 2011/0292145 | A1 | 12/2011 | Hoover et al. | |
| 2015/0091967 | A1 | 4/2015 | Ueda | |
| 2019/0240997 | A1 | 8/2019 | De Roeck | |
| 2021/0213759 | A1 | 7/2021 | Escudero Gonzalez et al. | |

* cited by examiner

VACUUM CONVEYOR SYSTEM FOR INKJET PRINTING WITH ADJUSTMENT TO THE COVERED AREA

CROSS-REFERENCE TO RELATED APPLICATION(S)

This application is a continuation of U.S. patent application Ser. No. 17/523,723, filed on Nov. 10, 2021, entitled VACUUM CONVEYOR SYSTEM FOR INKJET PRINTING WITH ADJUSTMENT TO THE COVERED AREA, which is hereby incorporated by reference in its entirety.

TECHNICAL FIELD

This description relates generally to printing systems and specifically to a vacuum conveyor system for inkjet printing with adjustment to the covered area.

BACKGROUND

Inkjet printing systems are used for non-contact ink deposition. Printing systems can sometimes use vacuum conveyor mechanisms to convey a substrate along the ink deposition stage. However, the adjustment capabilities of traditional vacuum conveyor active area adjustment systems is compromised when trying to combine a method to adjust to the substrate width and a method to adapt to the machine loading/unloading conditions. As a result, the effectivity of conventional methods is sometimes limited.

SUMMARY

Apparatus, methods, and systems for a vacuum conveyor for inkjet printing with adjustment to the covered area are disclosed. In some embodiments, a system includes a vacuum table including a vacuum chamber configured to secure a substrate for inkjet printing of the substrate. A substrate transportation system is operably coupled to the vacuum table and runs across a length of the vacuum table from a first side of the vacuum table to a second side of the vacuum table. The substrate transportation system is configured to convey the substrate from the first side to the second side for the inkjet printing. Multiple first actuators are operably coupled to the first side and located within the vacuum table. The multiple first actuators are configured to expand and retract across the length of the vacuum table from the first side to the second side to decrease the suction width and a suction length of the area of suction provided by the vacuum chamber in accordance with a substrate width and the length of the substrate transportation system covered by the substrate.

Multiple second actuators are operably coupled to the second side and located within the vacuum table. The multiple second actuators are configured to expand and retract along the length of the vacuum table from the first side to the second side to increase the suction length of the area of the suction in accordance with the length covered by the substrate contacting the substrate transportation system. A controller is coupled to the multiple first actuators and the multiple second actuators and configured to select one or more actuators of the multiple first actuators. The one or more actuators are caused to expand across the length of the vacuum table in accordance with the substrate width and the length of the vacuum table covered by the substrate. The multiple second actuators are caused to retract along the length of the vacuum table in accordance with the length covered by the substrate.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

In the following description, for the purposes of explanation, numerous specific details are set forth in order to provide a thorough understanding of the present embodiments. It will be apparent, however, that the present embodiments may be practiced without these specific details.

This document presents systems, methods, and apparatus for a vacuum conveyor for inkjet printing with adjustment to the covered area. The embodiments disclosed herein present methods for expanding, by a controller of a vacuum conveyor system, first one or more actuators of multiple first actuators of the vacuum conveyor system to decrease the suction width of the area of suction provided by the vacuum conveyor system in accordance with the width of a substrate being inkjet printed using the vacuum conveyor system. A second one or more actuators of the multiple first actuators are retracted while the multiple second actuators are expanded. The controller retracts multiple second actuators of the vacuum conveyor system to increase the suction length of the area of suction as the substrate transportation system of the vacuum conveyor system moves the substrate along the vacuum conveyor system for inkjet printing of the substrate. This situation is maintained as long as the number of substrates on the conveyor is a maximum number. As the machine is unloaded of substrates, the controller expands the multiple retracted first actuators of the vacuum conveyor system to decrease the suction length as the substrate moves along the vacuum conveyor system.

The advantages and benefits of the vacuum conveyor system for inkjet printing with adjustment to the covered area using the embodiments described herein include improved integration of combined adjustment systems to substrate width and machine loading/unloading conditions. Further, the pneumatic expanding actuators used in some embodiments provide increased robustness over traditional methods. The embodiments disclosed herein provide the capability to handle a single substrate during the machine loading/unloading scenarios.

Figure 1:
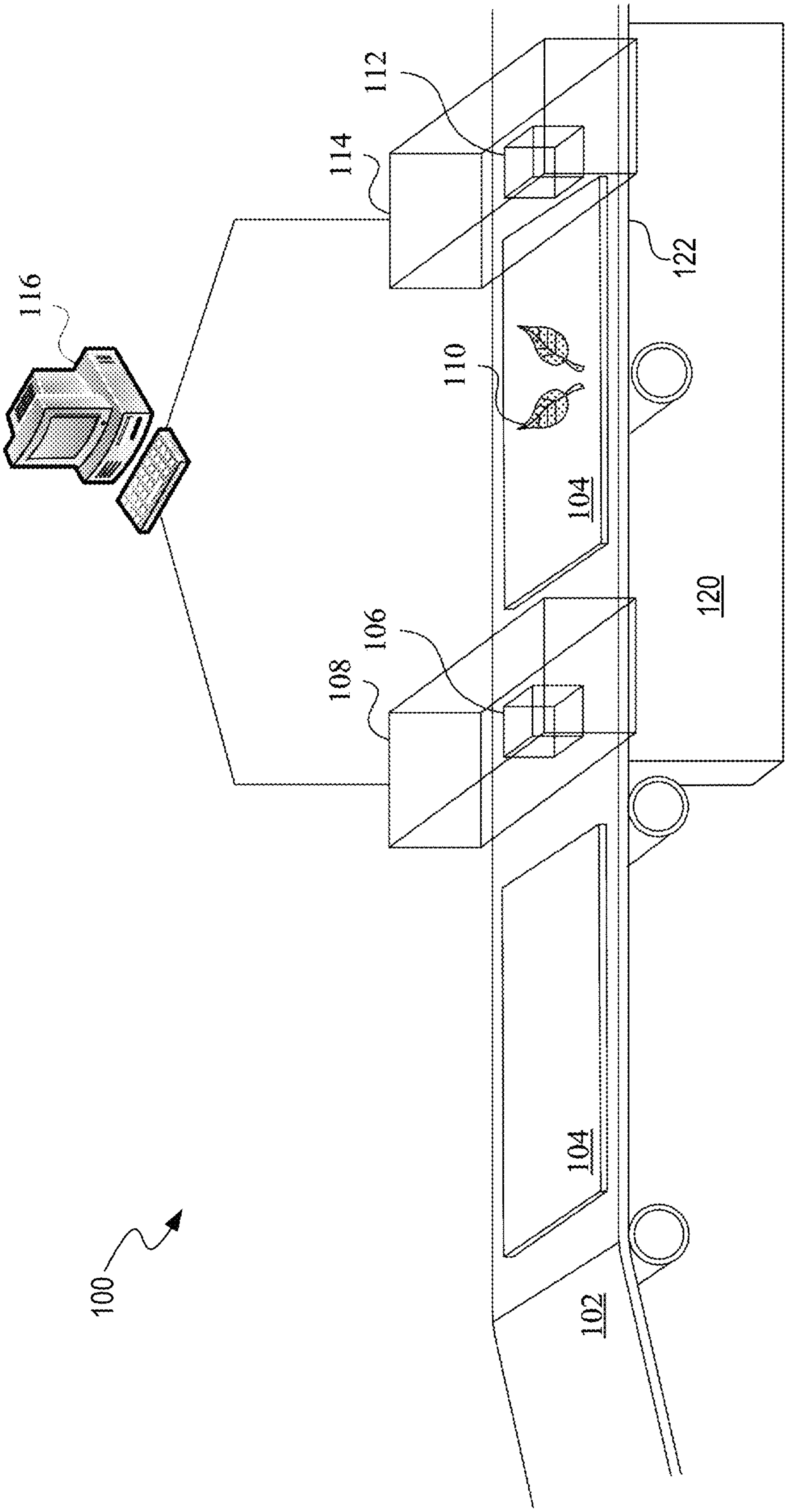
FIG. 1 illustrates a perspective view of a printing system, in accordance with one or more embodiments.

FIG. 1 illustrates a perspective view of a printing system 100, in accordance with one or more embodiments. The printing system 100 includes a printer head 106, at least one light source 112, and a substrate transportation system 102. Embodiments may include various combinations of these and other components, e.g., a dryer. For example, the light source 112 may be present in some embodiments, but not in others. As another example, a dryer may be included if an image 110 will not be quickly transferred to a substrate. The substrate transportation system 102 can include a belt, actuators, pulleys, etc., to move the substrate. While the printing system 100 of FIG. 1 can include a transfer belt, other means for conveying and/or retaining a substrate or transfer material 104 can also be used, such as a rotating platform or stationary bed.

The printer head 106 is configured to deposit ink onto a substrate or the transfer material 104 in the form of an image 110. An example substrate 532 is illustrated and described in more detail with reference to FIG. 5B. The transfer material 104, which may also be referred to as a former material, is flexible, which allows the image 110 to be transferred to complex-shaped substrates. For example, the transfer material 104 may be a rubber former, a thermoformable material, etc. In some embodiments, the printer head 106 is an inkjet printer head that jets ink onto the substrate or the transfer material 104 using, for example, piezoelectric nozzles. Thermal printer heads are generally avoided in an effort to avoid premature sublimation of the ink. In some embodiments, the ink is a solid energy, e.g., UV curable ink. However, other inks may also be used, such as water-based energy curable inks or solvent-based energy curable inks. The ink can be deposited in different forms, such as ink droplets and colored polyester ribbons.

In some embodiments, one or more light sources 112 cure some or all of the ink deposited onto the substrate or the transfer material 104 by emitting UV radiation. The light source(s) 112 may be, for example, a UV fluorescent bulb, a UV light emitting diode (LED), a low-pressure, e.g., mercury (Hg) bulb, or an excited dimer (excimer) lamp and/or laser. Various combinations of these light sources could be used. For example, a printing system 100 may include a low-pressure Hg lamp and a UV LED. As discussed in more detail with reference to FIG. 2, the light source 112 may be configured to emit UV radiation of a particular subtype.

The printer head 106 and light source 112 are illustrated as being directly adjacent to one another, i.e., neighboring without any intervening components. However, additional components that assist in printing, curing, etc., may also be present. For example, multiple distinct light sources 112 may be positioned behind the printer head 106. FIG. 1 illustrates one possible order in which components may be arranged in order to print an image 110 onto the substrate or the transfer material 104. Other embodiments are considered in which additional components are placed before, between, or after the illustrated components, etc.

In some embodiments, one or more of the aforementioned components are housed within one or more carriages. For example, the printer head 106 can be housed within a printing carriage 108, the light source 112 can be housed within a curing carriage 114, etc. In addition to protecting the components from damage, the carriages may also serve other benefits. For example, the curing carriage 114 can limit what portion(s) of the transfer material 104 and image 110 are exposed during the curing process. The printing system 100 may include pulleys, motors, rails, and/or any combination of mechanical or electrical technologies that enable the carriages to travel along the substrate transportation system (e.g., the transfer belt 102), i.e., with respect to the substrate or the transfer material 104. The transfer belt 102 is affixed to a vacuum table 120 and moves over a vacuum platen 122 that is on top of the vacuum table 120. The vacuum table and moves over a vacuum platen are illustrated and described in more detail with reference to FIG. 4. In alternative embodiments, the carriages can be fixedly attached to a rail or base of the printing system 100. In these embodiments, the transfer material 104 can be moved in relation to the printer head 106, light source 112, etc., such that ink can be deposited onto the transfer material 104.

In various embodiments, some or all of the components are controlled by a computer system 116. The computer system 116 is the same as or similar to the computer system 700 illustrated and described in more detail with reference to FIG. 5. The computer system 116 can allow a user to input printing instructions and information, modify print settings, e.g., by changing cure settings, alter the printing process, etc.

Figure 2:
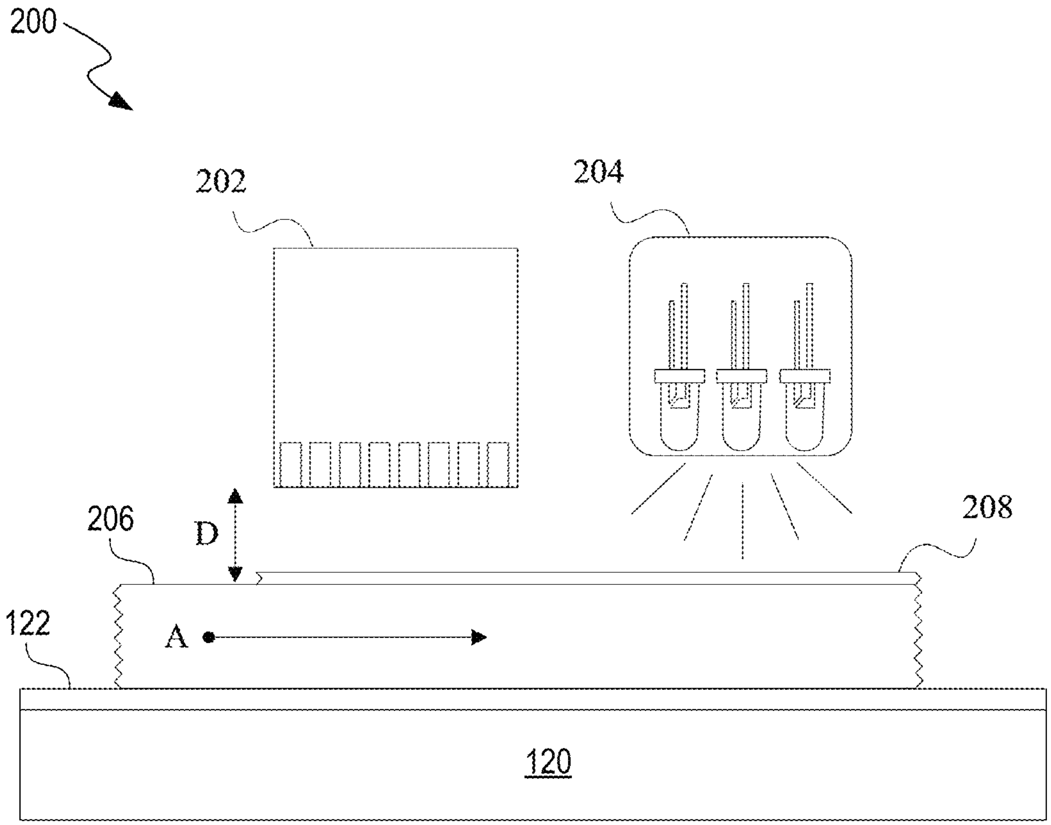
FIG. 2 illustrates a side view of a printing system, including a printer head and a light source, in accordance with one or more embodiments.

FIG. 2 illustrates a side view of a printing system 200, including a printer head 202 and a light source 204, in accordance with one or more embodiments. While a single-pass configuration is illustrated by FIG. 2, other embodiments may employ multi-pass, i.e., scan, configurations. Similarly, embodiments can be modified for various printers, e.g., flatbed printer, drum printer, or lane printer. For example, a flatbed printer may include a stable bed and a traversing printer head, a stable printer head and a traversing bed, etc. A substrate transportation system is affixed to a vacuum table 120 and moves over a vacuum platen 122 that is on top of the vacuum table 120. The vacuum table and vacuum platen are illustrated and described in more detail with reference to FIG. 4.

The printer head 202 can include distinct ink/color drums, e.g., cyan, magenta, yellow, and black (CMYK), or colored polyester ribbons that are deposited onto the surface of a transfer material 206. Path A represents the media feed direction, e.g., the direction in which the substrate or the transfer material 206 travels during the printing process. Path D represents the distance between the printer head 202 and the surface of the transfer material 206.

As described above, both direct and indirect printing have conventionally been carried out only on flat surfaces. The printing systems and methods described herein, however, allow images to be printed on complex-shaped, i.e., non-planar, surfaces by depositing ink directly onto a substrate or a transfer material 206 and then transferring the ink to a substrate. When printing directly onto a surface, print quality relies on accuracy of ink drop placement. Therefore, maintaining a constant or nearly constant distance between the printer head 202 and the flat surface of the transfer material 206 is necessary. Airflow, velocity variability, etc., can affect drop placement even when the change in distance is small, e.g., a few millimeters.

In some embodiments, a light source 204 cures some or all of the ink 208 deposited onto the substrate or the transfer material 206 by the printer head 202. The light source 204 may be configured to emit wavelengths of UV electromagnetic radiation of subtype V (UVV), subtype A (UVA), subtype B (UVB), subtype C (UVC), or any combination thereof. Generally, UVV wavelengths are those wavelengths measured between 395 nanometers (nm) and 445 nm, UVA wavelengths measure between 315 nm and 395 nm, UVB wavelengths measure between 280 nm and 315 nm, and UVC wavelengths measure between 100 nm and 280 nm. However, one skilled in the art will recognize these ranges are somewhat adjustable. For example, some embodiments may characterize wavelengths of 285 nm as UVC.

The light source 204 may be, for example, a fluorescent bulb, a light emitting diode (LED), a low-pressure, e.g., mercury (Hg) bulb, or an excited dimer (excimer) lamp/laser. Combinations of different light sources could be used in some embodiments. Generally, the light source 204 is selected to ensure that the curing temperature does not exceed the temperature at which the ink 208 begins to sublime. For example, light source 204 of FIG. 2 is a UV LED lamp that generates low heat output and can be used for a wider range of former types. UV LED lamps are associated with lower power consumption, longer lifetimes, and more predictable power output.

Other curing processes may also be used, such as epoxy (resin) chemistries, flash curing, and electron beam technology. One skilled in the art will appreciate that many different curing processes could be adopted that utilize specific timeframes, intensities, rates, etc. The intensity may increase or decrease linearly or non-linearly, e.g., exponentially, logarithmically. In some embodiments, the intensity may be altered using a variable resistor or alternatively by applying a pulse-width-modulated (PWM) signal to the diodes in the case of an LED light source.

Figure 3:
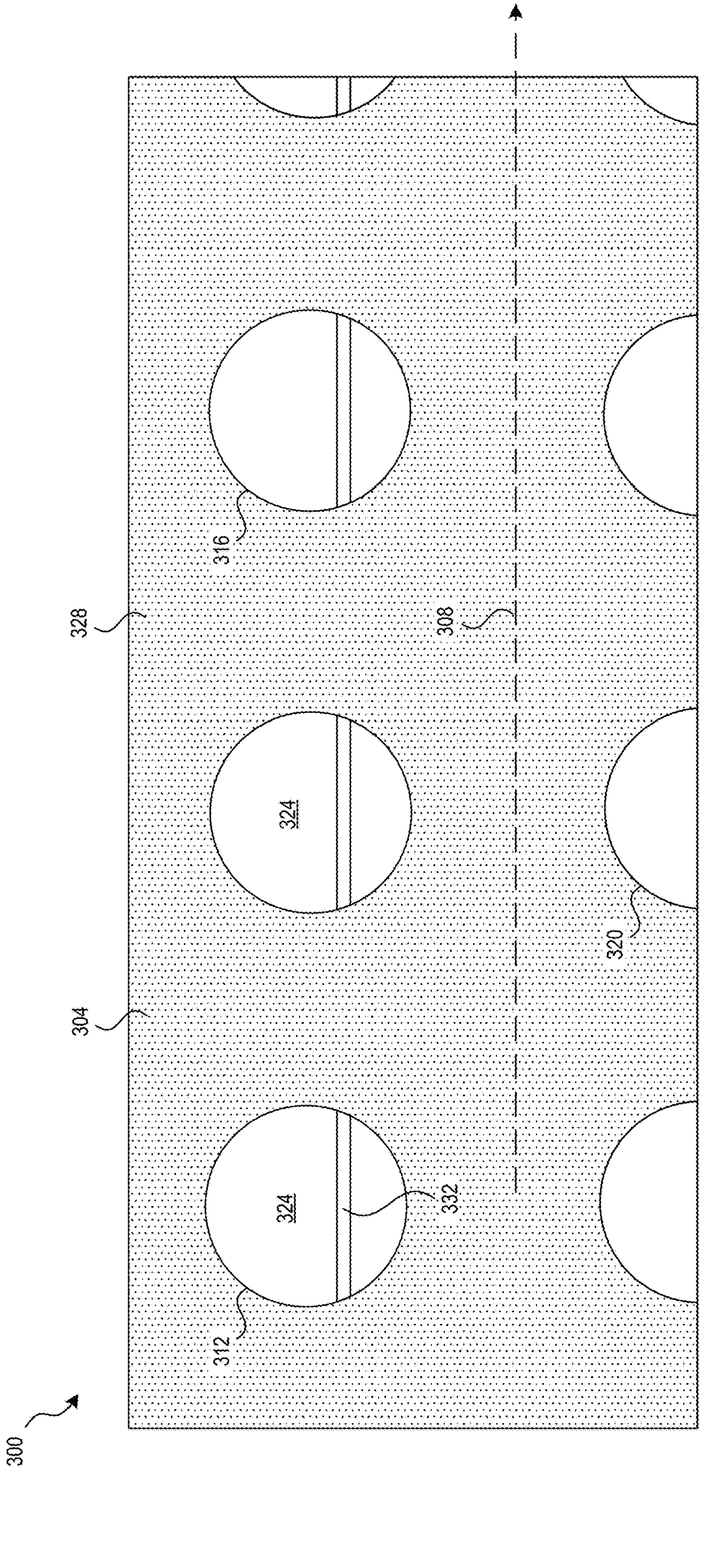
FIG. 3 illustrates a planar view of components of a vacuum conveyor system for inkjet printing with adjustment to the covered area, in accordance with one or more embodiments.

FIG. 3 illustrates a planar view of components of a vacuum conveyor system 300 for inkjet printing with adjustment to a covered area, in accordance with one or more embodiments. The components of the vacuum conveyor system 300 shown in FIG. 3 include a substrate transportation system and a vacuum platen 324. In embodiments, the substrate transportation system can be a belt 304. Additional components of the vacuum conveyor system 300 include components of the computer system 700 illustrated and described in more detail with reference to FIG. 7. Likewise, other embodiments include different and/or additional components, or be connected in a different way.

The vacuum conveyor system 300 is used for inkjet printing, and uses a vacuum chamber 416 (see FIG. 4) connected to one or more vacuum pumps for providing suction to a vacuum platen 324 as part of the media transport. A substrate 532 to be printed is carried on a substrate transportation system over the vacuum platen 324 that has multiple openings. In some embodiments, the substrate transportation system is an air-transmissive belt 304. An example substrate 532 is illustrated and described in more detail with reference to FIG. 5B. The vacuum platen 324 draws air into the apertures or openings 332 of the vacuum chamber 416, creating a pressure differential between the upper and lower faces of the substrate 532 that flattens the substrate 532 against the vacuum platen 324, with the belt 304 sliding over the vacuum platen 324 to feed the substrate 532 past the printing device. An example printing device 106 is illustrated and described in more detail with reference to FIG. 1. The printing device can be a thermal inkjet pen that reciprocates over the substrate in a scan direction perpendicular to the feed direction 308, and which lays down successive swaths of ink droplets to generate a printed image on the substrate 532. In some embodiments, the vacuum platen 324 is heated to facilitate rapid drying of aqueous ink. The vacuum (suction) generated secures the substrate 532 in a flat stable position as the ink dries.

In the embodiments described herein, the vacuum conveyor system 300 secures the substrate 532 to the belt 304 by suction. The belt 304 of the vacuum conveyor system 300 supports the substrate 532 being inkjet printed. In some embodiments, the belt 304 moves the substrate 532 from a first side 536 of the vacuum conveyor system 300 to a second side 540 of the vacuum conveyor system 300 opposite the first side 536. The first side 536 and the second side 540 of the vacuum conveyor system 300 are illustrated and described in more detail with reference to FIG. 5A. In some embodiments, the vacuum platen 324 is further configured to flatten the substrate 532 to the belt 304.

The belt 304 defines multiple perforations 312, 316 positioned to convey suction from the vacuum platen 324 to the substrate 532 to secure the substrate 532 to a second surface of the belt 304. The second surface of the belt 304 faces away from the vacuum platen 324, and the substrate 532 lies on the second surface of the belt 304. In some embodiments, the multiple perforations 312, 314 are arranged in multiple rows along the length 520 of the vacuum platen 324. The vacuum platen 324 defines openings 332 corresponding to the multiple perforations 312, 316. The openings 332 are arranged according to the multiple rows. In some embodiments, each actuator of the multiple first actuators 404 is configured to expand to block perforations in a respective row of the multiple rows. The multiple first actuators 404 are sometimes referred to as a first array of actuators 404. The multiple first actuators 404 are illustrated and described in more detail with reference to FIG. 4. In some embodiments, one or more actuators 524 of the multiple first actuators 404 are configured to expand to decrease leakage of suction provided by the vacuum conveyor system 300 from areas of the belt 304 of the vacuum conveyor system 300 lacking contact with the substrate 532. The one or more actuators 524 are illustrated and described in more detail with reference to FIG. 5C.

The belt 304 of the vacuum conveyor system 300 moves the substrate 532 along the vacuum conveyor system 300 for inkjet printing of the substrate 532. In some embodiments, the belt 304 is operably coupled to the vacuum chamber 416 and runs from a first side 536 of the vacuum chamber 416 to a second side 540 of the vacuum chamber 416. The belt 304 includes a first surface 328 proximal to the vacuum chamber 416 and a second surface opposite the first surface 328 and distal to the vacuum chamber 416. The belt 304 is configured to convey the substrate 532 on the second surface from the first side 536 to the second side 540 for inkjet printing of the substrate 532.

Figure 4:
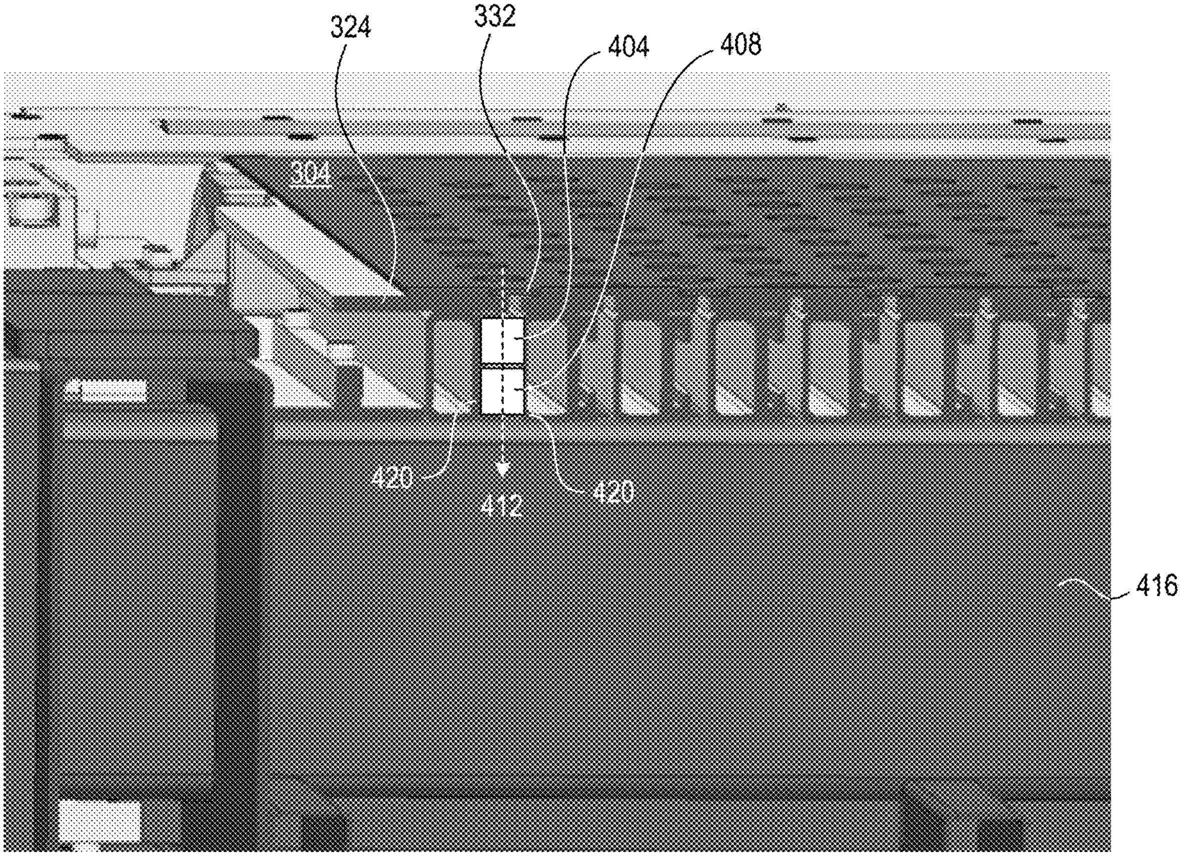
FIG. 4 is a cross-sectional view of a vacuum conveyor system for inkjet printing with adjustment to the covered area, in accordance with one or more embodiments.

FIG. 4 is a cross-sectional view of a vacuum conveyor system 400 for inkjet printing with adjustment to the covered area, in accordance with one or more embodiments. FIG. 4 shows a cross-section perpendicular to the feed direction 308. The vacuum conveyor system 400 includes a vacuum table including a vacuum chamber 416, multiple first actuators 404, multiple second actuators 408, and a substrate transportation system. The multiple second actuators 408 are sometimes referred to as a second array of actuators. Likewise, other embodiments include different and/or additional components, or are connected in a different way.

The vacuum table is a system for holding a substrate 532 during printing. The substrate 532 is illustrated and described in more detail with reference to FIG. 5B. The vacuum table includes a perforated tabletop having the vacuum chamber 416 and a vacuum pump to keep the vacuum chamber 416 below ambient pressure. As shown in FIG. 4, the vacuum table includes the vacuum chamber 416 configured to secure the substrate 532 for inkjet printing of the substrate 532. The vacuum chamber 416 is configured to secure the substrate 532 by providing suction to the substrate 532. The multiple first actuators 404 are sometimes referred to as a first array of actuators and the multiple second actuators 408 are sometimes referred to as a second array of actuators.

The combination of both the arrays of actuators 404, 408 block the flow of air in the direction 412 passing through the openings 332 of the vacuum platen 324. In some embodiments, at least one actuator of the multiple first actuators 404 and the multiple second actuators 408 is an extensible pneumatic or hydraulic actuator. Such actuators convert energy (e.g., of compressed fluid) into mechanical motion to regulate a length that the actuator is extended. For adequate performance: 1) the actuators are surrounded by elements 420 (e.g., a guiding channel) against which the actuators can apply pressure in order to prevent the flow through the openings 332 of the vacuum platen 324, and 2) the actuators have the ability to move longitudinally with respect to the surrounding elements 420 in order to conduct the previously described expansion-retraction sequence. Suitable actuators for this purpose include pneumatic or hydraulic actuators with high extensibility ratios (i.e., a length ratio between fully extended and fully retracted states) in order to reduce the space they take. Some examples include: 1) bellow-shaped actuators, 2) a rolled-up bladder (like a water hose) in which the application of pressure from the free end unrolls the actuator and expands it longitudinally, or 3) a rolled-up bladder turned inside out at the free tip in which the pressure induces eversion of the bladder and longitudinal expansion. An important aspect in the selection of the actuator for use is how to make possible the application of pressure to seal the flow while allowing free longitudinal movement. The third actuator proposed above has obvious advantages in this regard as the eversion motion means that there is no relative motion between the actuator walls and the surrounding elements 420 during longitudinal expansion, such that the friction force between these two elements does not impede motion. For the kinds of actuators where relative motion takes place, different methods based on hydrodynamic lubrication can be employed to reconcile these apparently opposing requirements.

In some embodiments, the controller 440 is coupled to the one or more actuators 524 and the multiple second actuators 408. The controller 440 is configured to cause the one or more actuators 524 of the multiple first actuators 404 to expand across the length 520 of the vacuum chamber 416 as a substrate width 552 decreases. The substrate width 552 is shown in more detail in FIG. 5B. The controller 440 causes the multiple second actuators 408 to retract along the length 520 of the vacuum chamber 416 as the length covered by the substrates 560 contacting the substrate transportation system increases. The length covered by the substrates 560 is shown in more detail in FIG. 5B.

A controller 440 is coupled to the multiple first actuators 404 and the multiple second actuators 408. The controller 440 is implemented using components of the computer system 700 illustrated and described in more detail with reference to FIG. 7. The controller 440 selects one or more actuators 524 of the multiple first actuators 404 and causes the one or more actuators 524 to expand and retract across a length 520 of the vacuum table. The length 520 is illustrated in more detail with reference to FIG. 5A. The one or more actuators 524 are illustrated in more detail with reference to FIG. 5C. In some embodiments, expanding and retracting the one or more actuators 524 includes controlling, by the controller 440, a cavity length of the one or more actuators 524 using pressurized fluid. The controller 440 causes the multiple second actuators 408 to expand and retract along the length 520 of the vacuum table. In some embodiments, one or more solenoid valves 432 are coupled to the one or more actuators 524 of the multiple first actuators 404. The controller 440 is configured to select the one or more actuators 524 using the one or more solenoid valves 432. A solenoid valve is a control element that can shut off, release, or distribute fluid to the multiple first actuators 404. In other embodiments, the controller 440 selects another one or more actuators 528 from the multiple first actuators 404 using the one or more solenoid valves 432 that are coupled to the one or more actuators 528. The one or more actuators 528 are illustrated in more detail with reference to FIG. 5C.

FIGS. 5A, 5B, 5C, and 5D illustrate planar views of a vacuum conveyor system 300 for inkjet printing with adjustment to the covered area, in accordance with one or more embodiments. These figures show, in chronological order, the typical sequence of loading and unloading of substrates the vacuum conveyor system 300. The vacuum conveyor system 300 is illustrated and described in more detail with reference to FIG. 3. Likewise, other embodiments include different and/or additional components, or are connected in a different way.

Figure 5A:
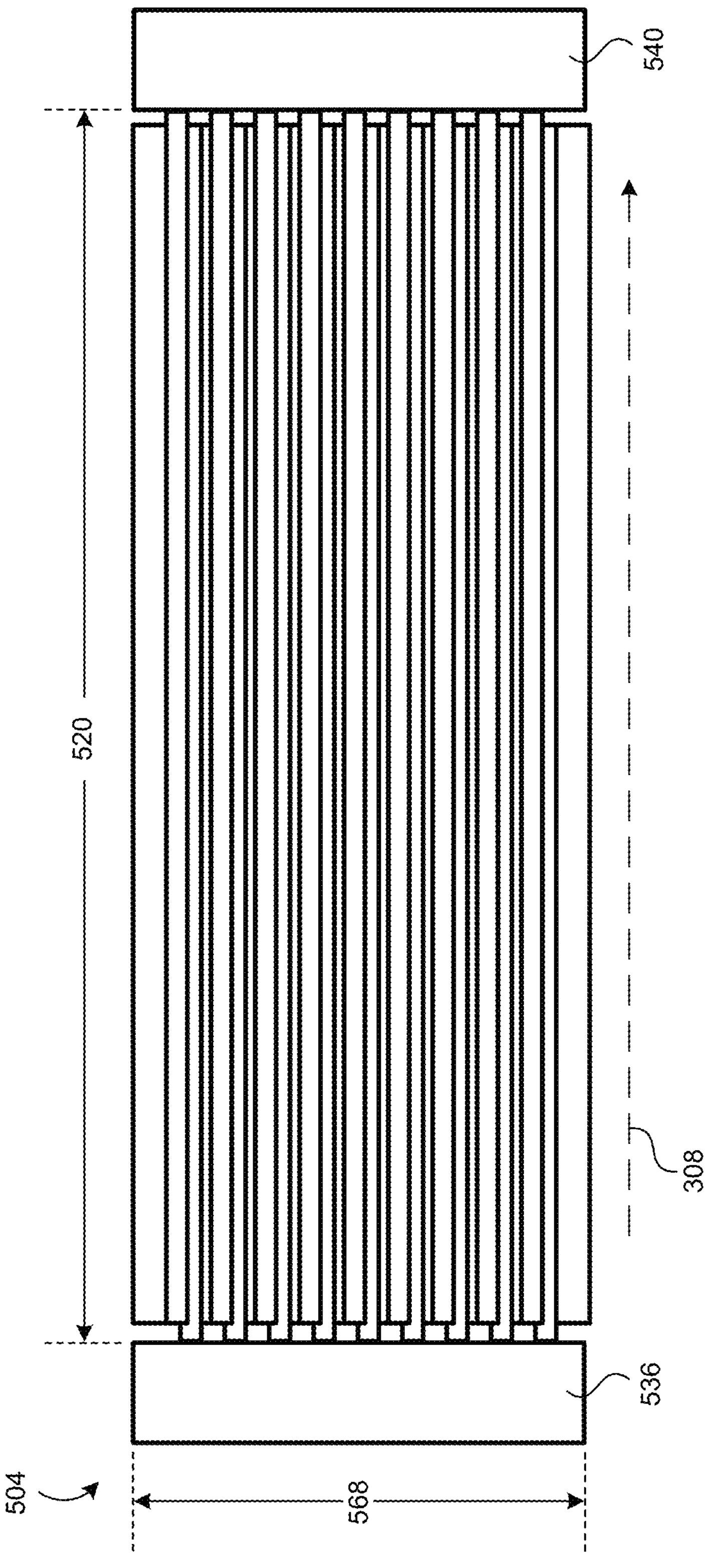
FIGS. 5A, 5B, 5C, and 5D illustrate planar views of a vacuum conveyor system for inkjet printing with adjustment to the covered area, in accordance with one or more embodiments.

FIG. 5A shows the vacuum conveyor system 300 in a first configuration 504. The vacuum conveyor system 300 is used to ensure that a substrate is held flat below the printheads. The efficiency of the vacuum conveyor system 300 is increased by the embodiments described herein when the active area is restricted to the region covered by the substrate. In the first configuration 504, a substrate 532 has not yet been placed on the vacuum table. The substrate 532 is illustrated and described in more detail with reference to FIG. 5B. To prevent leakage of the suction and decrease in the vacuum pressure in the vacuum chamber 416, the actuators 404, 408 are expanded. The vacuum chamber 416 and the actuators 404, 408 are illustrated and described in more detail with reference to FIG. 4.

A substrate transportation system is operably coupled to the vacuum table and runs across a length 520 of the vacuum table from a first side 536 of the vacuum table to a second side 540 of the vacuum table. In some embodiments, the substrate transportation system includes a substrate transportation system illustrated and described in more detail with reference to FIG. 3. In embodiments, the substrate transportation system can be the belt 304. The belt 304 is configured to convey the substrate 532 from the first side 536 to the second side 540 for inkjet printing. In some embodiments, the multiple second actuators 408 are further configured to expand across the length 520 of the vacuum table from the second side 540 to the first side 536 to decrease a suction length 556 of the area 548 of suction where the substrate 532 contacts the belt 304. The suction length 556 and area 548 of suction are illustrated and described in more detail with reference to FIG. 5D.

Figure 5B:
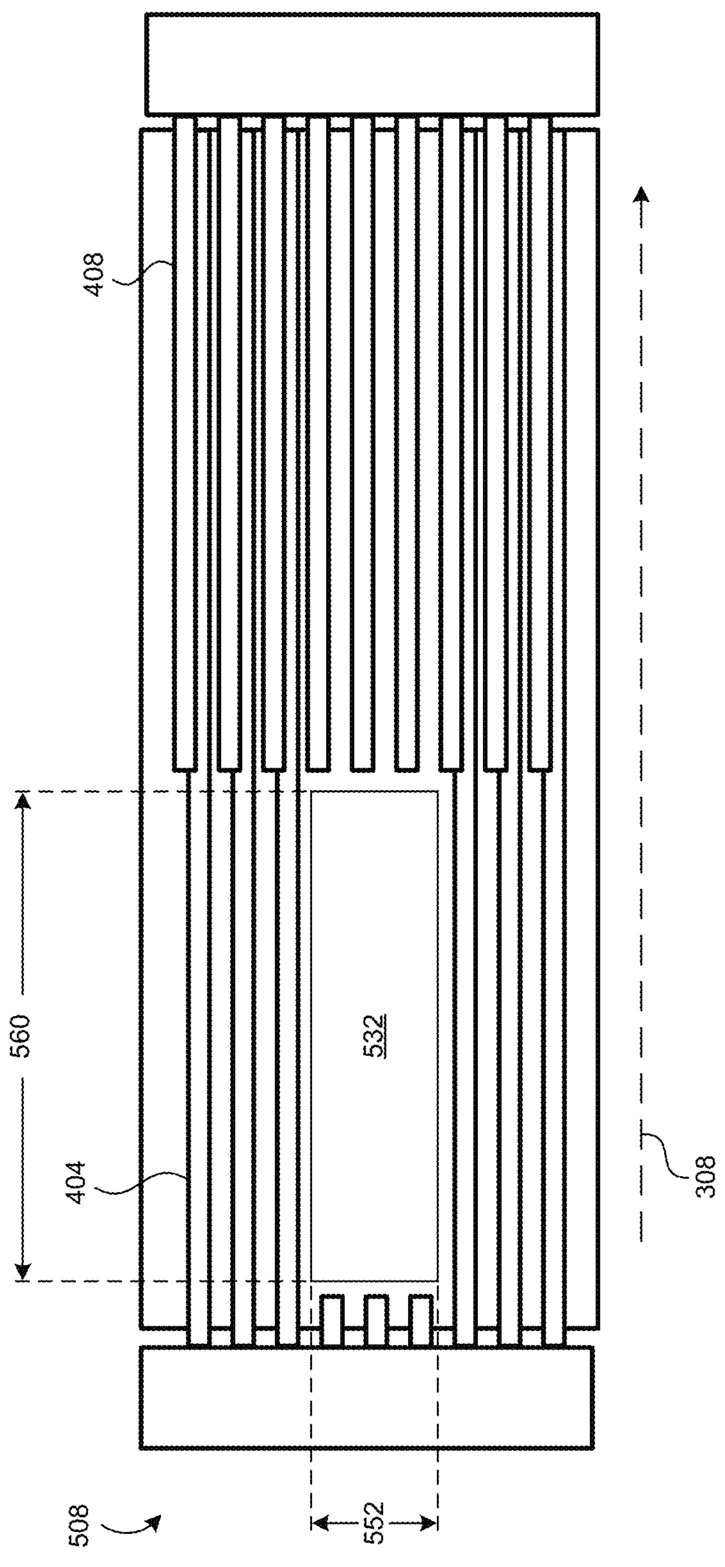

FIG. 5B shows the vacuum conveyor system 300 in a second configuration 508 where the vacuum conveyor system is being loaded with substrates. In the second configuration 508, the substrate 532 is entering on the left (entry) portion of the substrate transportation system (e.g., belt 304) on the vacuum table. The vacuum table is illustrated and described in more detail with reference to FIG. 4. To prevent leakage of the suction and decrease in the vacuum pressure in the vacuum chamber 416, some of the actuators 404 are expanded. All of the actuators 408 are expanded. The vacuum chamber 416 is illustrated and described in more detail with reference to FIG. 4.

The substrate 532 is located outside the vacuum chamber 416 and between the first side 534 and the second side 540 as shown by FIG. 5B. The first side 534 and the second side 540 are shown by FIG. 5A. The multiple first actuators 404 are retracted along the length 520 of the vacuum table from the second side 540 to the first side 534 to increase the suction width 544 in accordance with the substrate width 552. The length 520 is shown by FIG. 5A. The suction width 544 is shown by FIG. 5D. In some embodiments, the multiple first actuators 404 are operably coupled to the first side 536 of the vacuum chamber 416 and configured to expand from the first side 536 to the second side 540 of the vacuum chamber 416 to decrease the suction width 544 of the area of suction 548 provided by the vacuum chamber 416 to secure the substrate 532 for inkjet printing. In some embodiments, the multiple second actuators 408 are operably coupled to the second side 540 and configured to retract from the first side 536 to the second side 540 to increase a suction length 556 of the area 548 of the suction as the total length 560 of the substrate 532 contacting the belt 304 increases. The suction length 556 is shown by FIG. 5D. In some embodiments, the controller 440 has feedback mechanisms (e.g., position sensors) that enables synchronization of the movement of the tip of the multiple second actuators 408 and that of the leading edge of the substrate 532 to minimize the leakage area of the vacuum chamber 416. In some embodiments, the multiple first actuators 404 and the multiple second actuators 408 are arranged in multiple rows along the width 568 of the vacuum chamber 416.

In some embodiments, the multiple first actuators 404 are further configured to retract from the second side 540 to the first side 536 to increase the suction width 544 as the substrate width 552 increases. The multiple second actuators 408 are further configured to expand from the second side 540 to the first side 536 to decrease the suction length 556 before the substrate 532 contacts the belt 304. The controller 440 (see FIG. 4) expands the multiple second actuators 408 of the vacuum conveyor system 300 to decrease the suction length 556 of the area 548 of suction. The controller 440 retracts the multiple second actuators 408 of the vacuum conveyor system 300 to increase the suction length 556 as the substrate 532 moves along the vacuum conveyor system 300. In some embodiments, the multiple second actuators 408 are expanded prior to the substrate 532 contacting the belt 304. The multiple first actuators 404 are operably coupled to the first side 536 and configured to expand to decrease the suction width 544 of the area 548 of suction provided by the vacuum chamber 416 in accordance with the substrate width 552.

In some embodiments, the multiple second actuators 408 are operably coupled to the second side 540 and configured to retract to increase the suction length 556 of the area 548 of suction in accordance with the total length 560 of the substrates contacting the belt 304. The multiple first actuators 404 are configured to expand to decrease leakage of suction provided by the vacuum chamber 416 from areas of the belt 304 lacking contact with the substrate 532. The multiple second actuators 408 are further configured to expand to decrease leakage of suction provided by the vacuum chamber 416 from areas of the belt 304 lacking contact with the substrate 532. In some embodiments, the controller 440 causes another one or more actuators 528 (see FIG. 5C) of the multiple first actuators 404 to expand across the length 520 of the vacuum conveyor system 300 in accordance with the substrate width 552 of the substrate 532. The controller 440 causes the multiple second actuators 408 to retract as the total length 560 of the substrates contacting the belt 304 of the vacuum conveyor system 300 increases.

Figure 5C:
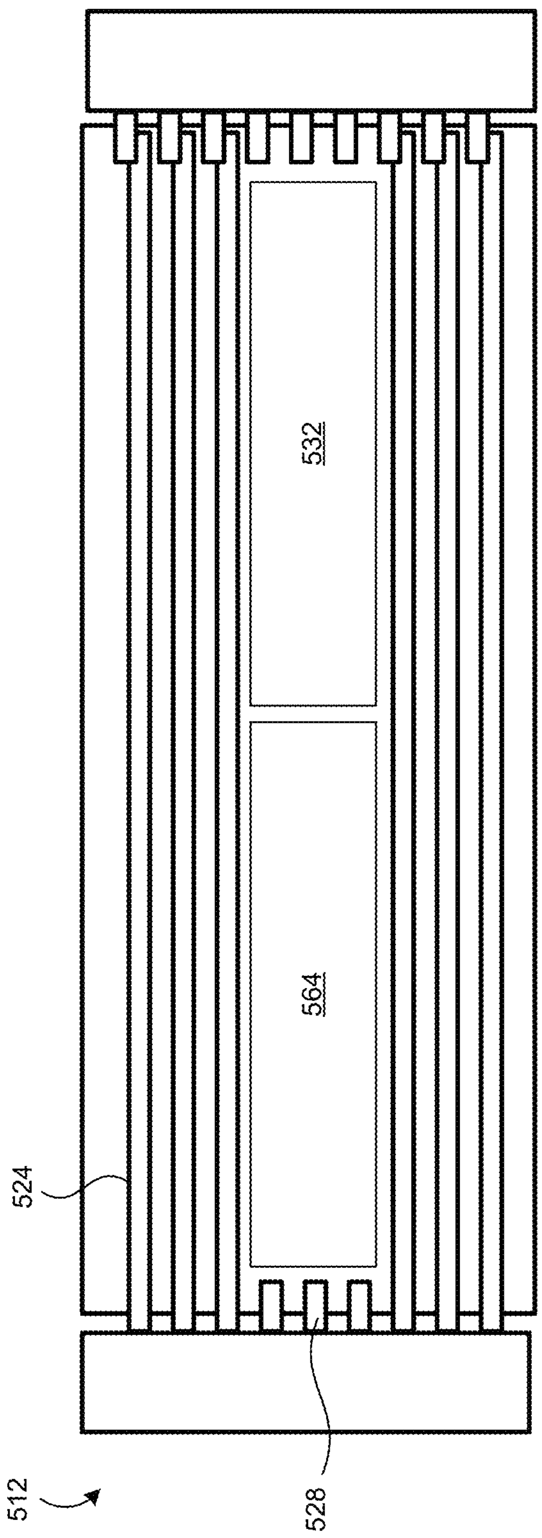
Figure 5D:
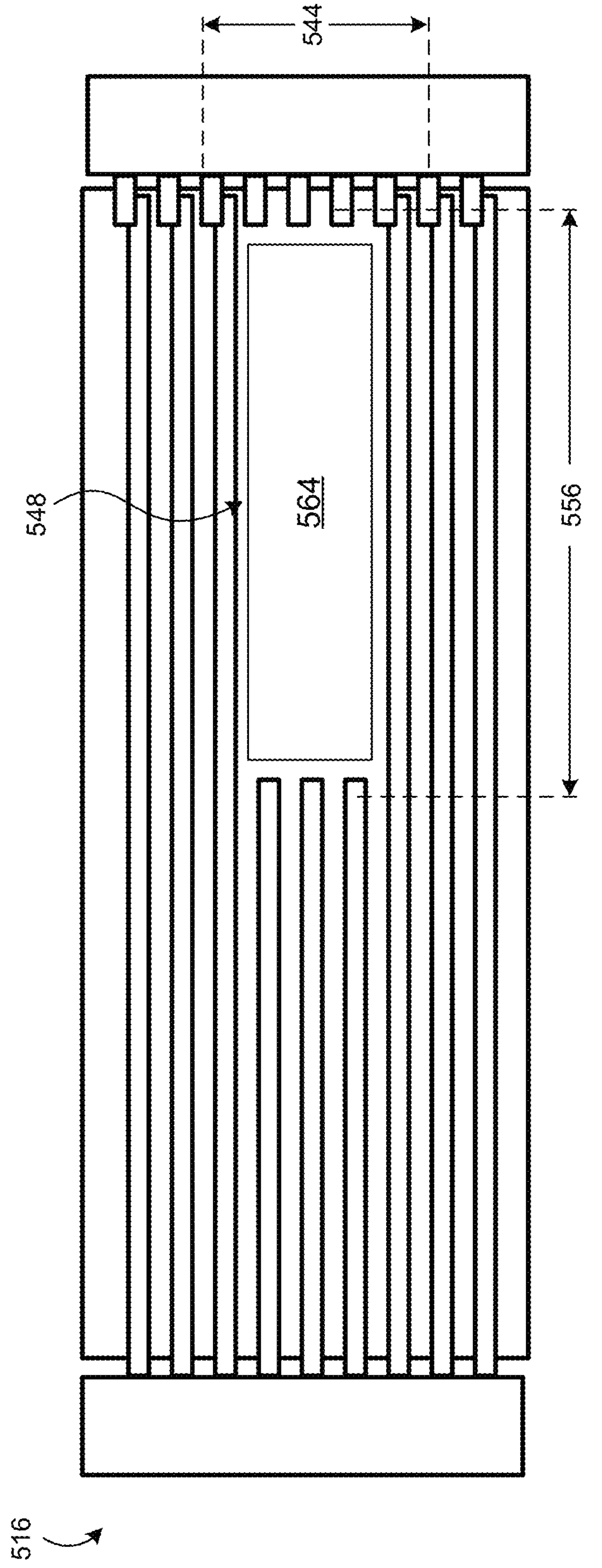

FIG. 5C shows the vacuum conveyor system 300 in a third configuration 512 where the total length of the vacuum conveyor is covered by substrates. In the third configuration 512, the substrate 532 has moved from the first side 536 of the vacuum table to the second side 540 of the vacuum table. Another substrate 564 is now occupying the left portion of a substrate transportation system (e.g., the belt 304) and following the substrate 532 to be printed after the substrate 532 is printed.

The controller 440 is coupled to the multiple first actuators 404 and the multiple second actuators 408. The controller 440 is illustrated and described in more detail with reference to FIG. 4. In this third configuration, the retraction or expansion of the multiple first actuators 404 and the multiple second actuators 408 is not modified. This is because both the total length 560 of the substrates contacting the belt 304 of the vacuum conveyor system 300 and the substrate width 552 of the substrate 532 remain invariable.

FIG. 5D shows the vacuum conveyor system 300 (see FIG. 3) in a fourth configuration 516 where the vacuum conveyor system is being unloaded of substrates. In the fourth configuration 516, the substrate 564 has moved from the first side 536 (see FIG. 5A) of the vacuum table to the second side 540 of the vacuum table. The substrate 564 is shown shortly about to exit the vacuum table on the second side 540 after the inkjet printing. There is no other substrate on the left hand portion of a substrate transportation system (e.g., the belt 304).

The multiple first actuators 404 (see FIG. 5B) are operably coupled to the first side 536 and located within the vacuum table. Some of the multiple first actuators 404 are expanded across the length 520 of the vacuum table from the first side 536 to the second side 540 to decrease a suction width 544 of an area 548 of suction provided by the vacuum chamber in accordance with a substrate width 552 (see FIG. 5B). During this phase, the controller 440 (see FIG. 4) of the vacuum conveyor system 300 expands the rest of the multiple first actuators 404 in order to follow the trailing edge of the last substrate 564 on the belt. In some embodiments, the controller 440 has feedback mechanisms (e.g., position sensors) that allow synchronization of the movement of the tip of the first actuators 404 and that of the leading edge of the substrate 532 to minimize the leakage area of the vacuum chamber 416. The multiple second actuators 408 are operably coupled to the second side 540 and located within the vacuum table. During this phase, the multiple second actuators remain retracted along the length 520 of the vacuum table.

In some embodiments, the suction width 544 and the substrate width 552 are each oriented perpendicular to the direction 308 along the length 520 of the vacuum chamber 416. The suction width 544 and the substrate width 552 are each oriented perpendicular to the direction 308 of motion of the belt 304. In some embodiments, the previously described sequence is simplified by using a separate system for adjusting to the substrate width. In such embodiments, the multiple first actuators 404 are all configured in the same state, either retracted or expanded.

Figure 6:
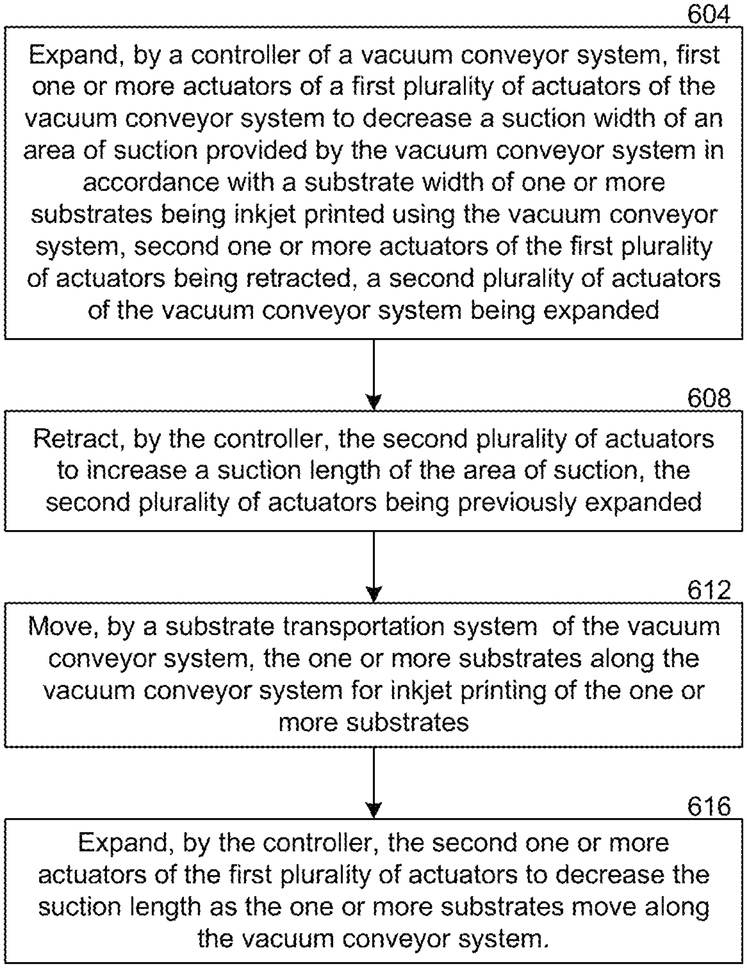
FIG. 6 is a flow diagram illustrating a process for a vacuum conveyor system for inkjet printing with adjustment to the covered area, in accordance with one or more embodiments.

FIG. 6 is a flow diagram illustrating a process for a vacuum conveyor system for inkjet printing with adjustment to the covered area, in accordance with one or more embodiments. In some embodiments, the process of FIG. 6 is performed using a vacuum conveyor system, e.g., the system 300 illustrated and described in more detail with reference to FIG. 3. In other embodiments, the process of FIG. 6 is performed using components of the computer system 700 illustrated and described in more detail with reference to FIG. 7. Likewise, other embodiments include different and/or additional steps, or are performed in a different order.

In step 604, a controller 440 (see FIG. 4) of the vacuum conveyor system 300 expands one or more actuators 524 of multiple first actuators 404 of the vacuum conveyor system 300 to decrease a suction width 544 (see FIG. 5D) of an area of suction 548 provided by the vacuum conveyor system 300 in accordance with a substrate width 552 of one or more substrates 532 being inkjet printed using the vacuum conveyor system 300. Another one or more actuators 528 of the multiple first actuators 404 are retracted. The controller 440 can be computer circuitry or software and is implemented using components of the computer system 700 illustrated and described in more detail with reference to FIG. 7.

In step 608, the controller 440 retracts multiple second actuators 408 (see FIG. 5B) of the vacuum conveyor system 300 to increase a suction length 556 of the area 548 of suction. The multiple second actuators 408 were previously expanded. In some embodiments, the multiple second actuators 408 are operably coupled to a second side 540 (see FIG. 5A) and configured to expand or retract from a first side 536 to the second side 540 to modify the suction length 556 of the area 548 of the suction as a total length 560 of the one or more substrates 532 contacting a substrate transportation system (e.g., the belt 304) increases. The suction length 556 is shown by FIG. 5D. In some embodiments, the multiple first actuators 404 and the multiple second actuators 408 are arranged in multiple rows along a width 568 (see FIG. 5A) of the vacuum chamber 416.

In step 612, a substrate transportation system of the vacuum conveyor system 300 moves the one or more substrates 532 along the vacuum conveyor system 300 for inkjet printing of the one or more substrates 532. For example, the belt 304 of the vacuum conveyor system 300 moves the substrate 532 along the vacuum conveyor system 300 for inkjet printing of the substrate 532. The belt 304 defines multiple perforations 312, 316 (see FIG. 3) positioned to convey suction from a vacuum platen 324 to the substrate 532 to secure the substrate 532 to a second surface of the belt 304. The second surface of the belt 304 faces away from the vacuum platen 324, and the substrate 532 lies on the second surface of the belt 304. In some embodiments, the multiple perforations 312, 314 are arranged in multiple rows along a length 520 (see FIG. 5A) of the vacuum platen 324. The vacuum platen 324 defines openings 332 corresponding to the multiple perforations 312, 316.

In step 616, the controller 440 expands the second one or more actuators 528 of the first plurality of actuators 404 to decrease the suction length 556 (see FIG. 5D) as the one or more substrates 532 move along the vacuum conveyor system 300.

Figure 7:
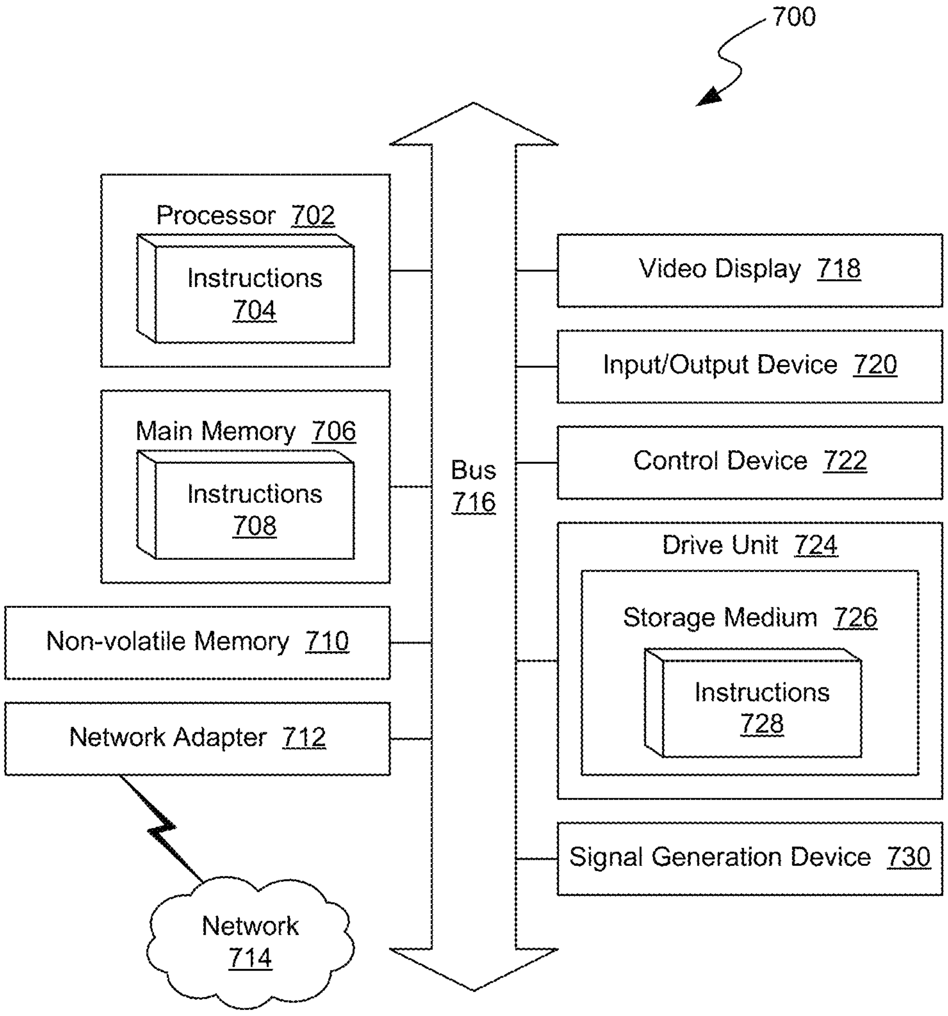
FIG. 7 is a block diagram illustrating a computer system to control a vacuum conveyor system for inkjet printing with adjustment to the covered area, in accordance with one or more embodiments.

FIG. 7 is a block diagram illustrating a computer system 700 to control a vacuum conveyor system for inkjet printing with adjustment to the covered area, in accordance with one or more embodiments. Components of the example computer system 700 can be used to implement the systems 100, 200, 300, and 400 illustrated and described in more detail with reference to FIGS. 1, 2, 3, and 4. At least some operations described with reference to FIG. 6 can be implemented on the computer system 700. Likewise, other embodiments include different and/or additional components, or be connected in a different way.

The computer system 700 can include one or more central processing units ("processors") 702, main memory 706, non-volatile memory 710, network adapter 712 (e.g., network interface), video display 718, input/output devices 720, control device 722 (e.g., keyboard and pointing devices), drive unit 724 including a storage medium 726, and a signal generation device 730 that are communicatively connected to a bus 716. The bus 716 is illustrated as an abstraction that represents one or more physical buses and/or point-to-point connections that are connected by appropriate bridges, adapters, or controllers. The bus 716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire").

The computer system 700 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality system (e.g., a head-mounted display), or another electronic device capable of executing a set of instructions (sequential or otherwise) that specify action (s) to be taken by the computer system 700.

While the main memory 706, non-volatile memory 710, and storage medium 726 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 728. The term "machine-readable medium" and "storage medium" shall also be taken to include any medium that is capable of storing, encoding, or carrying a set of instructions for execution by the computer system 700.

In general, the routines executed to implement the embodiments of the disclosure may be implemented as part of an operating system or a specific application, component, program, object, module, or sequence of instructions (collectively referred to as "computer programs"). The computer programs typically include one or more instructions (e.g., instructions 704, 708, 728) set at various times in various memory and storage devices in a computing device. When read and executed by the one or more processors 702, the instruction(s) cause the computer system 700 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 710, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 712 enables the computer system 700 to mediate data in a network 714 with an entity that is external to the computer system 700 through any communication protocol supported by the computer system 700 and the external entity. The network adapter 712 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 712 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

In additional embodiments, a system includes a substrate transportation system operably coupled to a vacuum chamber and running from a first side of the vacuum chamber to a second side of the vacuum chamber. The substrate transportation system includes a first surface proximal to the vacuum chamber and a second surface opposite the first surface. The second surface is distal to the vacuum chamber. The substrate transportation system is configured to convey a substrate on the second surface from the first side to the second side for inkjet printing of the substrate. Multiple first actuators are operably coupled to the first side and configured to expand to decrease a suction width of an area of suction provided by the vacuum chamber in accordance with a substrate width. Multiple second actuators are operably coupled to the second side and configured to retract to increase a suction length of the area of suction in accordance with a total length of the one or more substrates contacting the substrate transportation system.

In some embodiments, a controller is electrically coupled to the multiple first actuators and the multiple second actuators. The controller is configured to cause one or more actuators of the multiple first actuators to expand across a length of the vacuum chamber as the substrate width decreases. The multiple second actuators retract along the length of the vacuum chamber as the total length of the one or more substrates contacting the substrate transportation system increases.

In some embodiments, the suction width and the substrate width are each oriented perpendicular to a direction along a length of the vacuum chamber.

In some embodiments, the suction width and the substrate width are each oriented perpendicular to a direction of motion of a belt.

In some embodiments, the belt defines multiple perforations positioned to convey suction from the vacuum chamber to the substrate to secure the substrate to the second surface.

In some embodiments, the multiple perforations are arranged in multiple rows along the length of the vacuum table.

In some embodiments, the vacuum chamber defines openings corresponding to the multiple perforations, the openings arranged according to the multiple rows.

In some embodiments, each actuator of the multiple first actuators is configured to expand to block perforations in a respective row of the multiple rows.

In some embodiments, the multiple first actuators are configured to expand to decrease leakage of suction provided by the vacuum chamber from areas of the belt lacking contact with the substrate.

In some embodiments, the multiple second actuators are further configured to expand to decrease leakage of suction provided by the vacuum chamber from areas of the belt lacking contact with the substrate.

In some embodiments, a controller of a vacuum conveyor system expands one or more actuators of multiple first actuators of the vacuum conveyor system to decrease a suction width of an area of suction provided by the vacuum conveyor system as a substrate being inkjet printed using the vacuum conveyor system moves along a length of the vacuum conveyor system. The controller retracts multiple second actuators of the vacuum conveyor system to increase a suction length of the area of suction as the substrate moves along the length of the vacuum conveyor system.

In some embodiments, a belt of the vacuum conveyor system supports the substrate being inkjet printed. The belt moves the substrate from a first side of the vacuum conveyor system to a second side of the vacuum conveyor system opposite the first side.

In some embodiments, the one or more actuators are first one or more actuators. Second one or more actuators of the multiple first actuators are expanded to decrease the suction width of the area of suction prior to the substrate moving along the length of the vacuum conveyor system.

In some embodiments, the controller expands the multiple second actuators to decrease the suction length of the area of suction prior to the substrate moving along the length of the vacuum conveyor system.

In some embodiments, the one or more actuators are first one or more actuators. The controller causes second one or more actuators of the multiple first actuators to expand across the length of the vacuum conveyor system in accordance with a substrate width of the substrate.

In some embodiments, the controller causes the multiple second actuators to retract as the length of the substrates contacting a belt of the vacuum conveyor system increases.

In some embodiments, the suction width and a substrate width of the substrate are each oriented perpendicular to a direction along the length of the vacuum conveyor system.

In some embodiments, the suction width and a substrate width of the substrate are each oriented perpendicular to a direction of motion of a belt of the vacuum conveyor system.

In some embodiments, the one or more actuators are configured to expand to decrease leakage of suction provided by the vacuum conveyor system from areas of a belt of the vacuum conveyor system lacking contact with the substrate.

In some embodiments, a system includes one or more computer processors and a non-transitory, computer-readable storage medium storing computer instructions, which when executed by the one or more computer processors cause the one or more computer processors to expand one or more actuators of multiple first actuators of the system to decrease a suction width of an area of suction provided by the system as a substrate being inkjet printed using the system moves along a length of the system. Multiple second actuators of the system are retracted to increase a suction length of the area of suction as the substrate moves along the length of the system.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, but no special significance is to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications may be implemented by those skilled in the art.

We claim:

1. A system comprising:

a vacuum chamber configured to provide suction for securing a substrate for inkjet printing of the substrate;

a vacuum platen operably coupled to the vacuum chamber and defining multiple longitudinal openings, wherein the vacuum platen is configured to:

receive the suction from the vacuum chamber; and draw air into the multiple longitudinal openings towards the vacuum chamber;

a belt operably coupled to the vacuum chamber and running from a first side of the vacuum chamber to a second side of the vacuum chamber, wherein the vacuum platen is positioned between the vacuum chamber and the belt, and wherein the belt comprises:

a first surface proximal to the vacuum chamber; and a second surface opposite the first surface and distal to the vacuum chamber, the belt configured to convey the substrate on the second surface from the first side to the second side for inkjet printing of the substrate, wherein the belt defines multiple perforations arranged to convey the suction from the vacuum platen to the substrate to secure the substrate to the second surface, and wherein the multiple longitudinal openings correspond to the multiple perforations;

a first plurality of actuators positioned between the vacuum chamber and the vacuum platen and configured to expand to adjust a suction width of an area of suction provided by the vacuum chamber in accordance with a substrate width by blocking at least some of the multiple perforations and at least some of the multiple longitudinal openings; and a second plurality of actuators positioned between the vacuum chamber and the vacuum platen and configured to retract to adjust a suction length of the area of suction in accordance with a substrate length contacting the belt.

2. The system of claim 1, comprising a controller electrically coupled to the first plurality of actuators and the second plurality of actuators, the controller configured to:

cause one or more actuators of the first plurality of actuators to expand across a length of the vacuum chamber as the substrate width changes; and cause the second plurality of actuators to retract along the length of the vacuum chamber as the substrate length contacting the belt changes.

3. The system of claim 1, wherein the suction width and the substrate width are each oriented perpendicular to a direction along a length of the vacuum chamber.

4. The system of claim 1, wherein the suction width and the substrate width are each oriented perpendicular to a direction of motion of the belt.

5. The system of claim 1, wherein the multiple perforations are positioned to convey the suction from the vacuum chamber to the substrate to secure the substrate to the second surface.

6. The system of claim 5, wherein the multiple perforations are arranged in a plurality of rows along a length of the vacuum chamber.

7. The system of claim 6, wherein each actuator of the first plurality of actuators is configured to expand to block perforations in a respective row of the plurality of rows.

8. The system of claim 1, wherein the first plurality of actuators is configured to expand to reduce leakage of suction provided by the vacuum chamber from areas of the belt that lack contact with the substrate.

9. The system of claim 1, wherein the second plurality of actuators is configured to expand to reduce leakage of suction provided by the vacuum chamber from areas of the belt that lack contact with the substrate.

10. A method comprising:

providing, by a vacuum chamber, suction for securing a substrate for inkjet printing of the substrate;

receiving, by a vacuum platen operably coupled to the vacuum chamber, the suction from the vacuum chamber, wherein the vacuum platen defines multiple longitudinal openings;

drawing, by the vacuum platen, air into the multiple longitudinal openings towards the vacuum chamber;

conveying, by a belt, the substrate across the vacuum platen for inkjet printing of the substrate, wherein the belt defines multiple perforations arranged to convey the suction from the vacuum platen to the substrate to secure the substrate to the belt, and wherein the multiple longitudinal openings correspond to the multiple perforations;

expanding, by a controller of a vacuum conveyor system, one or more actuators of a first plurality of actuators of the vacuum conveyor system to adjust a suction width of an area of suction provided by the vacuum conveyor system as the substrate being inkjet printed using the vacuum conveyor system moves along a length of the vacuum conveyor system by blocking at least some of the multiple perforations and at least some of the multiple longitudinal openings, wherein the first plurality of actuators is positioned between the vacuum chamber and the vacuum platen; and retracting, by the controller, a second plurality of actuators of the vacuum conveyor system to adjust a suction length of the area of suction as the substrate moves along the length of the vacuum conveyor system, wherein the second plurality of actuators is positioned between the vacuum chamber and the vacuum platen.

11. The method of claim 10, wherein the one or more actuators are a first one or more actuators, the method comprising:

expanding a second one or more actuators of the first plurality of actuators to adjust the suction width of the area of suction prior to the substrate moving along the length of the vacuum conveyor system.

12. The method of claim 10, further comprising expanding, by the controller, the second plurality of actuators to adjust the suction length of the area of suction prior to the substrate moving along the length of the vacuum conveyor system.

13. The method of claim 10, wherein the one or more actuators are a first one or more actuators, the method comprising:

causing, by the controller, a second one or more actuators of the first plurality of actuators to expand across the length of the vacuum conveyor system in accordance with a substrate width of the substrate.

14. The method of claim 10, wherein the controller causes the second plurality of actuators to retract as a substrate length of the substrate contacting the belt of the vacuum conveyor system changes.

15. The method of claim 10, wherein the suction width and a substrate width of the substrate are each oriented perpendicular to a direction along the length of the vacuum conveyor system.

16. The method of claim 10, wherein the suction width and a substrate width of the substrate are each oriented perpendicular to a direction of motion of the belt of the vacuum conveyor system.

17. The method of claim 10, wherein the one or more actuators are configured to expand to reduce leakage of suction provided by the vacuum conveyor system from areas of the belt of the vacuum conveyor system lacking contact with the substrate.

18. A system comprising:

one or more computer processors; and a non-transitory, computer-readable storage medium storing computer instructions, which when executed by the one or more computer processors cause the one or more computer processors to:

provide, by a vacuum chamber, suction for securing a substrate for inkjet printing of the substrate;

receive, by a vacuum platen operably coupled to the vacuum chamber, the suction from the vacuum chamber, wherein the vacuum platen defines multiple longitudinal openings;

draw, by the vacuum platen, air into the multiple longitudinal openings towards the vacuum chamber;

convey, by a belt, the substrate across the vacuum platen for inkjet printing of the substrate, wherein the belt defines multiple perforations arranged to convey the suction from the vacuum platen to the substrate to secure the substrate to the belt, and wherein the multiple longitudinal openings correspond to the multiple perforations;

expand one or more actuators of a first plurality of actuators of the system to adjust a suction width of an area of suction provided by the system as the substrate being inkjet printed using the system moves along a length of the system by blocking at least some of the multiple perforations and at least some of the multiple longitudinal openings, wherein the first plurality of actuators is positioned between the vacuum chamber and the vacuum platen; and retract a second plurality of actuators of the system to adjust a suction length of the area of suction as the substrate moves along the length of the system.

19. The system of claim 18, wherein at least one actuator of the first plurality of actuators and the second plurality of actuators is controllable by pressurized fluid.

* * * * *